(12) United States Patent
Ghole

(10) Patent No.: US 6,518,995 B1
(45) Date of Patent: Feb. 11, 2003

(54) SYSTEM AND PROCESS FOR REMOTE, IN SITU METAL WORK

(76) Inventor: Jagannath Rao Ghole, 5335 Ashbrook Rd., Dallas, TX (US) 75227

( * ) Notice: Subject to any disclaimer, the term of this patent is extended or adjusted under 35 U.S.C. 154(b) by 385 days.

(21) Appl. No.: 09/612,836

(22) Filed: Jul. 10, 2000

(51) Int. Cl.$^7$ ................................................. A04N 7/18
(52) U.S. Cl. .......................... 348/82; 318/348; 348/81; 348/90; 348/143; 700/259; 901/42; 901/47
(58) Field of Search .............................. 348/82, 81, 90, 348/143; 318/568.21; 700/259; 901/42, 47

(56) References Cited

U.S. PATENT DOCUMENTS

| | | | |
|---|---|---|---|
| 4,502,407 A | * 3/1985 | Stevens | ........................ 348/81 |
| 4,508,954 A | 4/1985 | Kroll | |
| 4,571,475 A | 2/1986 | Rabe | |
| 4,907,169 A | * 3/1990 | Lovoi | .......................... 348/90 |

OTHER PUBLICATIONS

J. L. Saltel, et al, "In Situ Polymerization of Inflatable Composite Sleeve to Reline Damaged Tubing and Shut off Perforations", SPE Drilling and completion, Jun. 1999, pp. 115–122, vol. 14, Society of Petroleum Engineers, Richardson, Texas USA.

A Synopsis of Paper, SPE 38758, Economic In–Place Casing Lining and Repair, Journal of Petroleum Technology, Oct. 1997, pp. 1115–1116, vol. 49, Society of Petroleum Engineers, Richardson, Texas USA.

Prentice Creel et al, "Gels, Monomer, Solutions Fix Pinhole Casing Leaks", Oil and Gas Journal, Oct. 13, 1997, pp. 44–46, vol. 95, Penwell Publications, Tulsa, OK, USA.

Gabrashit S. Abdrakhmanov et al, "Isolation Profile Linear Helps Stabilize Problem Well Bores", Oil and Gas Journal, Sep. 11, 1995, pp. 50–52, vol. 93', Penwell Publications, Tulsa, OK, USA.

M. S. McGough et al, "Visual Monitoring of Remote Welding Operations", Welding Journal, Dec. 1990, pp. 23–28, vol. 69, Miami, Florida USA.

J. E. Agapakis, et al, Fundamentals and Advances in the Development of Remote Welding Fabrication Systems, Welding Journal Sep. 1986, pp. 21–32, vol. 65, Miami, Florida USA.

* cited by examiner

*Primary Examiner*—Howard Britton

(57) ABSTRACT

Oil and gas industry employs a large quantity of hardware in its operations. They require periodic repair, maintenance and modification. Many of these hardware are located beyond direct human access and in inhospitable environment. The traditional solution methods are handicapped, in most cases, by inevitable guesses as to the nature of problems; solutions tend to be less efficient and cost effective due to lack of direct, real time control. The present invention, consisting of a combined system and process, alleviates those problems by extending a remote operator's visual contact and operations control to work area. It combines the principles of oil field operations, coiled tubing, robotics and video technologies. A working tool, 22, is conveyed to work area at the end of a coiled tubing, 20. The working tool, 22, is operated remotely from command center, 12, by operator. Working tool, 22, contains cameras, grinder, wire brush, welder, mounted on teleoperators and servomechanism to control them. Welder can be replaced by cutter, reamer, milling machine or other metal working tool. Coiled tubing, 20, also serves as a means for circulating fluid, carrying small tubing for supplying welding shield gas to work area, carrying conduit for power and signal cables and for controlling differential pressure. Command center, 12, houses power and signal controls, video monitor, shield gas source and control and power source. The scope of this invention is not limited by changes in specific design details of any of the equipment, rearrangement of its components, its replacement or addition of other equipment.

19 Claims, 3 Drawing Sheets

SYSTEM AND PROCESS FOR REMOTE, IN SITU METAL WORK

BACKGROUND

1. Field of Invention

This invention relates to repair, maintenance and modifications of oil and gas field hardware, located in remote, inhospitable environment.

2. Description of Prior Art

Oil and Gas Field Production and Injection Wells:

North America has the highest concentration of active oil and gas wells in the world. They range in age from 50 years to recent. Most of these wells have low carbon steel casings and liners in them. Wear and tear—both mechanical and electrochemical (corrosion)—on the casings and liners are endemic to drilling and production operations. In most cases, casing or liner failure leads to cessation of operations at that well.

The traditional method that has been widely used for decades consists of spotting cement slurry in the defective interval and "squeezing" it through the defect to set and plug the leak. Many times it takes more than one attempt to seal the leak and can involve several days of well down time; sometimes the defect cannot be successfully repaired using this method. Moreover, casing or liner surface damage caused by post squeeze drilling and cleaning operation can set up corrosion cells and future problems. Since generally no visual evaluation of the problem is made, guess work plays a heavy role in the solution.

Another method of repair, sometimes used, consists of lining the inside of casing with liners. A special alloy liner has been used successfully in some cases and poly liners in some others. They are expensive and lack collapse strength; poly liners cause reduction of internal diameter so packers or bridge plugs cannot go through them and have low strength/bulk ratio.

Pipelines—Onshore:

There are over 170,000 miles of pipelines in U.S. alone. They require periodic maintenance to avoid long shut downs and environmental damage. The present method of repair involves digging out the buried pipe, plugging the line on both sides of the defective section, redirecting the flow through a temporary bypass, removing the damaged section, repairing and replacing the section. The process is expensive and time consuming.

Pipelines—Offshore:

Offshore pipelines are laid on the ocean floor. When a section of the line develops inevitable problem, one of the following three methods is currently used to repair it:

the defective section is raised to water surface, removed and replaced.

a diver/welder repairs the defect by under water welding.

specially manufactured mechanical connectors are used to repair the lines.

These methods are expensive and time consuming and exposes divers to risks.

Offshore Submarine Platform Structures:

The risers as well as platform structural members, such as tubular chords, braces and their weld joints require periodic inspection and maintenance. Any cracks or other defects are currently repaired by divers/welders. The process is expensive and exposes the divers to risks.

SUMMARY

In accordance with the present invention, an oil and gas field hardware repair, maintenance and modification system and process, combining principles of oil field operations, coiled tubing, robotics and video technologies, extend an operator's real time visual contact and operations control to remote and inhospitable work area, . By doing so, said system and process provide a viable, faster, safer and cost effective alternative to prevalent oil and gas field practices.

Objects and Advantages

Accordingly, besides the objects and advantages of providing a viable, faster, safer and cost effective alternative, several other objects and advantages of present invention are:

a) to provide a way for remote visual reconnaissance, diagnosis and evaluation of hardware problems;

b) to provide commensurate solution to specific local problem and to reinforce the problem area with corrosion resistant metal;

c) to provide a solution technique that is unaffected by presence of porous formations behind casings in wells;

d) to avoid drilling inside casing for cement clean up and thus avoid setting up potential corrosion cells leading to new leaks;

e) to avoid reducing casing internal diameter to a point, where it hinders subsequent use of packers and bridge plugs;

f) to reduce down time;

g) to increase probability of successful casing repair in first attempt;

h) to provide a basis for innovative preventive maintenance program;

i) to provide a cost effective alternative method to repair pipelines and offshore submarine structures.

DRAWING FIGURES

Closed Environment

FIGS. 1 and 2 show schematic diagrams depicting a basic configuration of equipment to carry out the invention in a closed environment such as well casing, liner, pipeline interior or riser interior.

FIG. 5 shows a block diagram of main components in working tool, 22.

Reference Numerals in Drawings— FIGS. 1, 2 and 5

10 Inlet Valve

12 Command Center, houses: power source & control; shield gas source &control; video monitor & signal control; operator

14 Conduit

16 Small Tubing

18 Slots

20 Coiled Tubing

22 Working Tool, containing: working teleoperator with welder, 36; surface preparation teleoperator with grinder and wire brush, 34, camera teleoperators with video cameras and lighting, 32 & 38

24 Outlet Valve for Closed Environment

26 Closed Environment

30 Servomechanism

32 & 38 Camera Teleoperators with video cameras and lighting

34 Surface Preparation Teleoperator with grinder and wire brush

36 Working Teleoperator with welder

Figure 1:
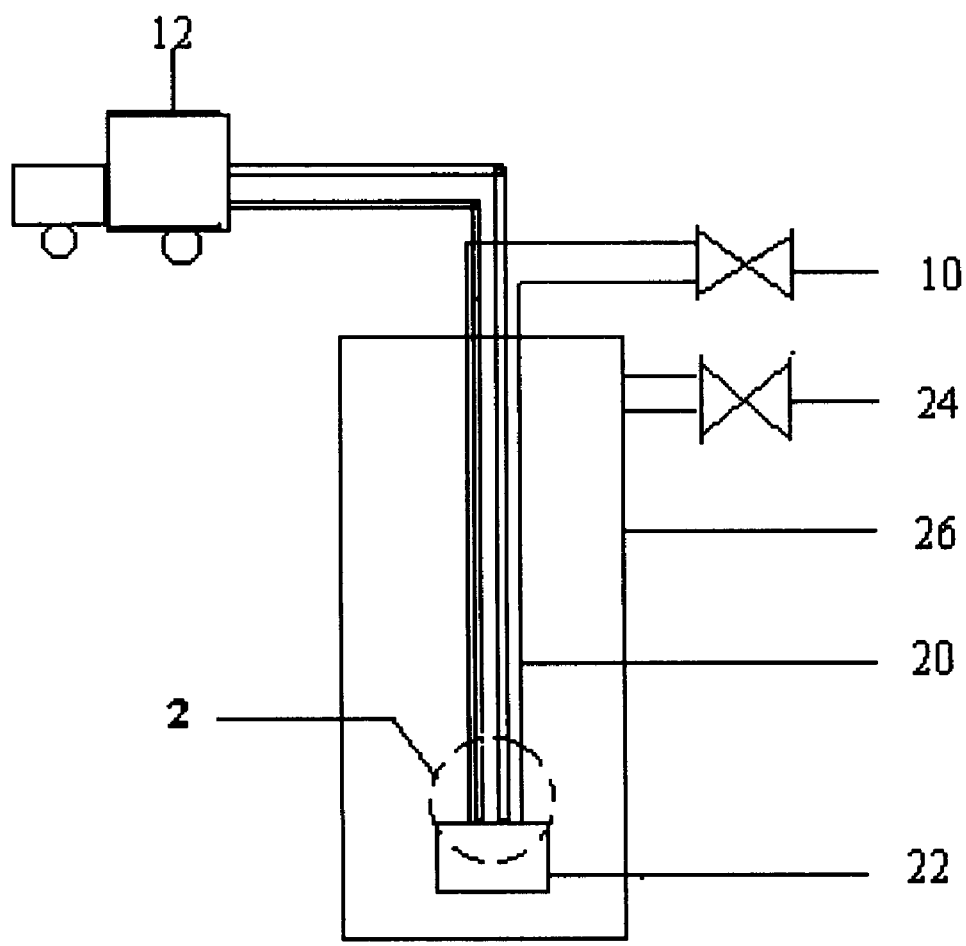
FIG. 1: Schematic Configuration of Equipment, Closed Environment
Figure 2:
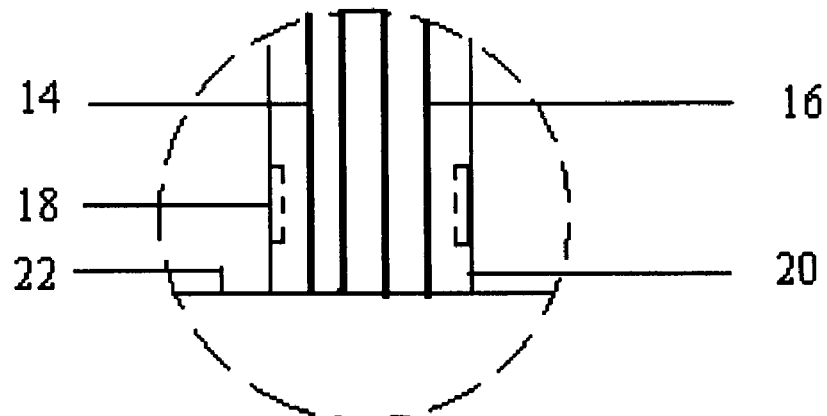
FIG. 2: Details Inside Dashed Circle in FIG. 1
Figure 5:
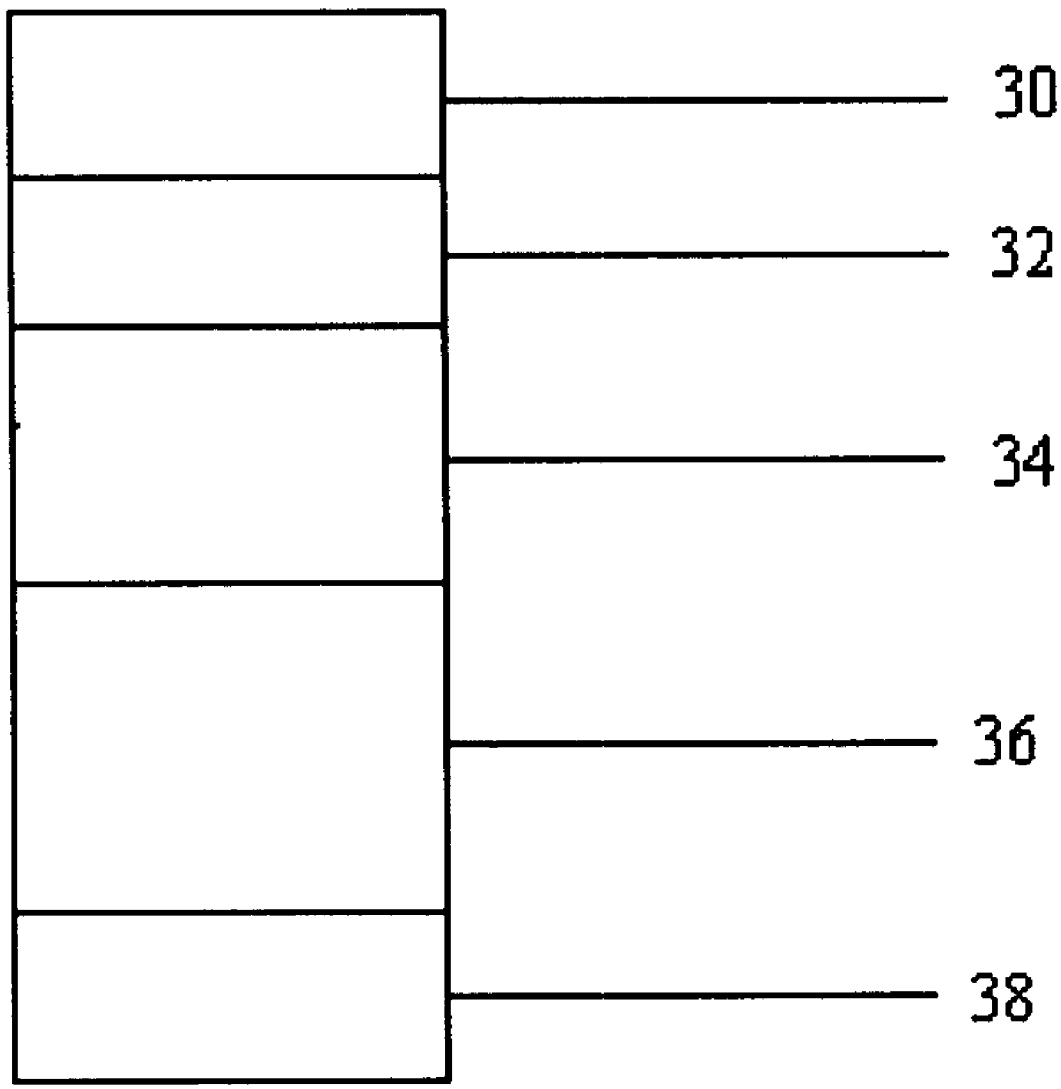
FIG. 5: Block Diagram, Main Components In Working Tool

DESCRIPTION—FIGS. 1, 2 and 5—Closed Environment

FIG. 1 depicts a schematic configuration of equipment to carry out the present invention in a closed environment, 26, such as well casing, liner, pipeline interior or riser interior. FIG. 2 shows a detailed view of a portion of FIG. 1, inside the dashed circle. FIG. 5 is a block diagram showing main components in working tool, 22. Closed environment, 26, has an outlet valve, 24, which is either a part of wellhead in a well or a valve in pipeline. A working tool, 22, is connected to a coiled tubing, 20, which facilitates push-pull type tool conveyance through vertical and non-vertical pipe trajectory. At the bottom of coiled tubing, 20, above working tool, 22, are slots, 18, for fluid circulation. Installed piggy-back on coiled tubing, 20, are a small tubing, 16, to convey shield gas to working tool, 22, and a conduit, 14, containing power and signal cables; both small tubing, 16, and conduit, 14, are connected to working tool, 22. A single conduit can be used in place of 14 and 16. At opposite end from working tool, 22, small tubing, 16, and conduit, 14, are routed to a command center, 12. In command center, 12, small tubing, 16, is connected to shield gas control. Power and signal cables from conduit, 14, are connected to power and signal controls respectively; coiled tubing, 20, is connected to an inlet valve, 10. Working tool, 22, contains in it, welder mounted on a working teleoperator, 36 (FIG. 5), grinder and wire brush mounted on a separate surface preparation teleoperator, 34 (FIG. 5) and two video cameras with lighting systems, each mounted on a separate camera teleoperator, 32 & 38 (FIG. 5). Control functions related to working tool, 22, are carried out by servomechanism, 30. Working tool, 22, may include an anchoring device that may vary with applications (not shown). Input command feed for servomechanism, 30, power feed to tools, operational controls and signals are transmitted through cables in conduit, 14.

Operation—FIGS. 1,2 and 5—Closed Environment

Closed environment, 26, is created in a production or injection well by setting a retrievable bridge plug above open perforations and in a pipeline, by closing the valves or plugging the line on either side of defective section. Working tool, 22, is lowered into closed environment, 26, to repair defect from interior, with video camera and lighting on camera teleoperator, 38., turned on, . After working tool, 22, reaches defective section, if fluid medium lacks sufficient optical clarity or if hazardous fluids in work area need to be flushed out, outlet valve, 24, and inlet valve, 10, are opened and clear water is pumped through coiled tubing, 20, through slots 18, to flush work area. Next, camera is positioned to examine defective area by command signal from command center, 12, to maneuver camera teleoperator, 38 (FIG. 5) in working tool, 22, and by adjusting camera, a clear view of defective section is obtained. Defect is examined to determine its type, shape and size. An appropriate welding solution is decided. If a differential pressure exists across defect from inside closed environment, 26, to outside, pressures are allowed to equalize inside-out. If differential pressure exists across defect from outside closed environment, 26, to inside, outlet valve, 24, is closed and clear water is pumped through inlet valve, 10, through coiled tubing, 20, until pressures are equalized inside-out. Next, teleoperator with camera, 32, is positioned and camera adjusted; then, grinder and wire brush are positioned on work surface by command signal from command center, 12, to maneuver surface preparation teleoperator, 34, in working tool, 22; then work surface is prepared for repair by operating grinder and wire brush; then, welder is positioned on work surface by command signal from command center, 12, to maneuver working teleoperator, 36, in working tool, 22; repair is carried out by operating welder, while supplying shield gas through small tubing, 16; then grinder and wire brush are re-positioned on work surface by command signal from command center, 12, to maneuver surface preparation teleoperator, 34, in working tool, 22; then the repaired surface is finished by operating grinder and wire brush. Repair integrity is tested by closing outlet valve, 24, and pumping clear water through inlet valve, 10, to pressure up work area and to check its integrity. Video records before and after repair are saved. Repair is complete.

DRAWING FIGURES—Open Environment

Figure 3:
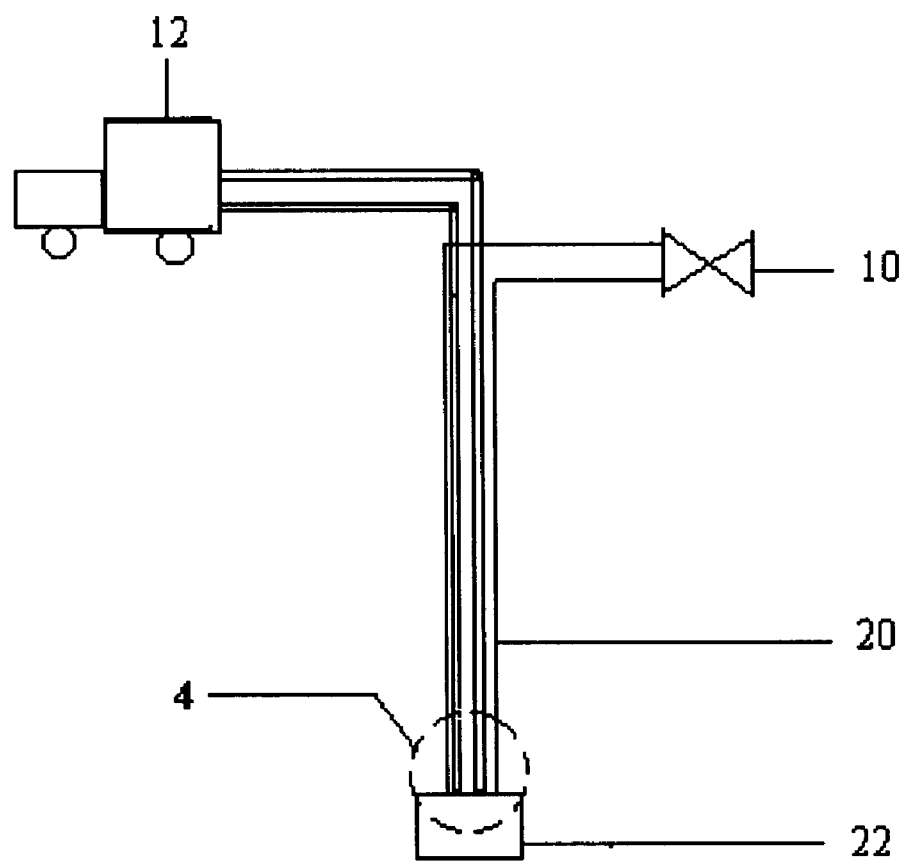
FIG. 3: Schematic Configuration of Equipment, Open Environment
Figure 4:
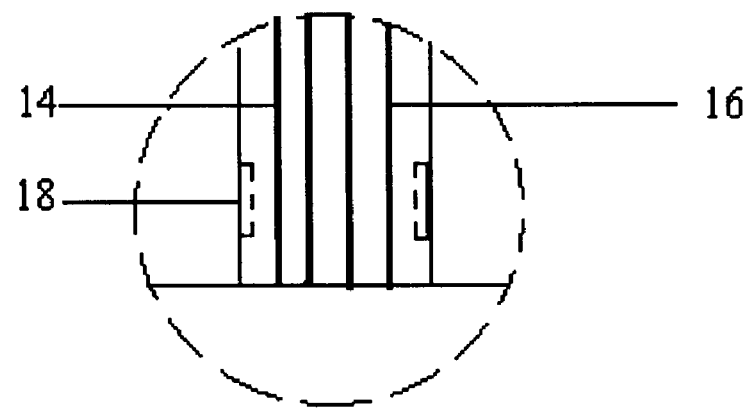
FIG. 4: Details Inside Dashed Circle in FIG. 3

FIGS. 3 and 4 show diagrams depicting a basic configuration of equipment to carry out the invention in an open environment such as offshore pipeline exterior or submarine structures.

Reference Numerals in Drawings—
FIGS. 3, 4 and 5

10 Inlet Valve

12 Command Center, houses: power source & control; shield gas source & control; video monitor & signal control; operator 14 Conduit 16 Small Tubing 18 Slots 20 Coiled Tubing 22 Working Tool, containing: working teleoperator with welder, 36; surface preparation teleoperator with grinder and wire brush, 34, camera teleoperators with video cameras and lighting, 32 & 38

30 Servomechanism

32 & 38 Camera Teleoperators with video cameras and lighting

34 Surface Preparation Teleoperator with grinder and wire brush

36 Working Teleoperator with welder

DESCRIPTION—FIGS. 3, 4 and 5—Open Environment

FIG. 3 depicts an overall configuration of equipment to carry out the present invention in an open environment such as offshore pipeline exterior or submarine structure. FIG. 4 shows a detailed view of a portion of FIG. 3, inside the dashed circle. A working tool, 22, is connected to a coiled tubing, 20, which facilitates push-pull type tool conveyance. At the bottom of coiled tubing, 20, above working tool, 22, are slots, 18, for fluid circulation. Installed piggy-back on coiled tubing, 20, are a small tubing, 16, to convey shield gas to working tool, 22, and a conduit, 14, containing power and signal cables; both small tubing, 16, and conduit, 14, are connected to working tool, 22. A single conduit can be used in place of 14 and 16. At opposite end from working tool, 22, small tubing, 16, and conduit, 14, are routed to a command center, 12. In command center, 12, small tubing, 16, is connected to shield gas control. Power and signal cables from conduit, 14, are connected to power and signal controls respectively; coiled tubing, 20, is connected to an inlet valve, 10. Working tool, 22, contains in it, welder mounted on a working teleoperator, 36 (FIG. 5), grinder and wire brush mounted on a separate surface preparation teleoperator, 34 (FIG. 5) and two video cameras with lighting systems, each mounted on a separate camera teleoperator, 32 & 38 (FIG. 5). Control functions related to working tool, 22, are carried out by servomechanism, 30. Working tool, 22, may include an anchoring device that may vary with applications (not shown). Input command feed for servomechanism, 30, power feed to tools, operational controls and signals are transmitted through cables in conduit, 14.

Operation—FIGS. 3, 4 and 5

Working tool, 22, is lowered into open environment to repair defect from exterior of a closed system, with video camera and lighting on camera teleoperator, 38., turned on, . After working tool, 22, reaches defective section, if fluid medium lacks sufficient optical clarity or if hazardous fluids in work area need to be flushed out, outlet valve, 24, and inlet valve, 10, are opened and clear water is pumped through coiled tubing, 20, through slots 18, to flush work area. The interior of the closed system adjacent to work area, containing hazardous fluids is flushed out. Next, camera is positioned to examine defective area by command signal from command center, 12, to maneuver camera teleoperator, 38 (FIG. 5) in working tool, 22, and by adjusting camera, a clear view of defective section is obtained. Defect is examined to determine its type, shape and size. An appropriate welding solution is decided. Next, teleoperator with camera, 32, is positioned and camera adjusted; then grinder and wire brush are positioned on work surface, by command signal from command center, 12, to maneuver surface preparation teleoperator, 34, in working tool, 22; then work surface is prepared for repair by operating grinder and wire brush; then, welder is positioned on work surface by command signal from command center, 12, to maneuver working teleoperator, 36, in working tool, 22; repair is carried out by operating welder, while supplying shield gas through small tubing, 16; then grinder and wire brush are re-positioned on work surface by command signal from command center, 12, to maneuver surface preparation teleoperator, 34, in working tool, 22; then the repaired surface is finished by operating grinder and wire brush. Repair integrity is tested by pressuring up interior of closed system, in case of pipeline or by inspection in case of submarine structure. Video records before and after repair are saved. Repair is complete.

Conclusion, Ramifications and Scope

Accordingly, the reader will see that said system and process in this invention provide a safe, time and cost saving way to repair leaks, cracks, splits and other defects in well casings, liners, pipelines and other hardware, located in remote and inhospitable environments in oil and gas field operations. Said process can also be used to repair chords, braces, connecting welds and other hardware in submarine structures supporting offshore platforms. Furthermore, said system and process have additional advantages in that:

Said system and process can be used successfully to repair oil/gas well liner top leaks, where traditional methods fail.

Said system and process provide a means for liner completion in steam injection wells.

Unwanted perforations in wells can be selectively plugged using said system and process.

Said system and process provide a cost and time saving alternative in pipelines and pipeline casing maintenance, onshore and offshore.

Said system and process can also be used to repair and maintain offshore submarine platform structures and risers.

Said system and process can be used to repair pinhole leaks, larger holes, cracks and splits.

Said system and process can be used for weld overlays and to weld patches and sleeves.

Said system and process can be used to develop a preventive maintenance program for tubulars in corrosive environment Said system and process can be used for periodic remote visual examination and evaluation of hardware conditions.

Said system and process can be used to make lateral window cuts in casings for directional drilling while in real time visual contact and control.

Said system and process can be used to mill, ream and carry out other metal workings, while in real time visual contact and operations control from a remote command center.

Said system and process can be used to restore full bore in a well, whose casing is parted and offset.

Several ramifications of said system and process are possible: coil tubing size and specific design details of working tool can vary with application; variations in sizes and shapes of work envelope requirements may necessitate variations in design of teleoperator links and joints; working tool may contain one or more video cameras; either MIG (metal in gas) or TIG (tungsten in gas) welding system may be used. A guidance system may be added to working tool. Weld wires can be changed according to the metallurgical requirements. Holes can replace slots in coiled tubing above working tool. Command center can be on land (onshore) or on barges (offshore). Surface manifold design for coiled tubing, small tubing and conduit can vary. Wellhead equipment for closed environment can be varied. Many other variations are possible. For example, small tubing and conduit can be run inside coiled tubing instead of outside. Shield gas and cables may be conveyed in one conduit instead of two or inside coiled tubing. Lighting arrangements may vary. Thus the scope of this invention is not limited by changes in specific design details of any of the equipment, rearrangement of its components, its replacement or addition of other equipment.

I claim:

1. A remote hardware repair, maintenance and modification system and process, combining principles of oil field operations, coiled tubing, robotics and video technologies, comprising the steps of:

a. incorporating in a working tool, video cameras, mounted on separate teleoperators, a grinder and wire brush mounted on another teleoperator, and a metal working tool, mounted on separate teleoperator; and servomechanism;

b. means for transmitting power and signals between remote command center and working tool;

c. means for supplying shield gas from remote command center to working tool;

d. means for conveying working tool to remote work area;

e. means for flushing out work area to create optical clarity and non-hazardous environment;

f. means for maintaining pressure control;

g. means for maneuvering camera teleoperator from remote command center to position video camera;

h. means for operating video camera from remote command center to view, diagnose and evaluate hardware defect;

i. means for determining appropriate repair solution to defect by visual evaluation;

j. means for maneuvering surface preparation teleoperator from remote command center to position grinder and wire brush on work surface;

k. means for operating grinder and wire brush from remote command center to clean and prepare work surface;

l. means for maneuvering working teleoperator from remote command center to position metal working tool on work surface;

m. means for operating metal working tool from remote command center;

n. means for maneuvering surface preparation teleoperator from remote command center to re-position grinder and wire brush on repaired surface;

o. means for operating grinder and wire brush from remote command center to finish repaired surface;

p. means to test repair integrity by pressuring up and checking for leak;

q. means for saving video records of work surface before and after repair;

whereby said system and process extend an operator's real time visual contact and operations control to remote work area and thereby hardware is repaired, maintained and modified from a remote distance.

2. The system and process in claim 1 comprising a welder as metal working tool.

3. The system and process in claim 1 comprising a cutter as metal working tool.

4. The system and process in claim 1 comprising a reamer as metal working tool.

5. The system and process in claim 1 comprising a milling machine as metal working tool.

6. The system and process in claim 1 as means to repair casing leaks, splits, holes and other casing maintenance problems in wells.

7. The system and process in claim 1 as means to selectively plug unwanted perforations in wells.

8. The system and process in claim 1 as means to repair liner leaks and liner top leaks in wells.

9. The system and process in claim 1 as means for liner completion in steam injection wells.

10. The system and process in claim 1 as means to develop a preventive maintenance program for tubulars in corrosive environment.

11. The system and process in claim 1 as means to cut directionally oriented windows in well casing for lateral kickoff, while in real time visual contact and control.

12. The system and process in claim 1 as means to repair pipeline leaks.

13. The system and process in claim 1 as means for periodic inspection and maintenance of submarine platform structures, pipelines, well casings and liners.

14. The system and process in claim 1 as means for restoring full bore in a well in which casing is parted and offset.

15. The system and process in claim 1, wherein one conduit carries power and signal cables as well as shield gas outside coiled tubing.

16. The system and process in claim 1, wherein one conduit carries power and signal cables as well as shield gas inside coiled tubing.

17. The system and process in claim 1, wherein number of cameras used varies.

18. The system and process in claim 1, wherein predetermined design parameters in working tool, coiled tubing and other parts of the system and process vary substantially.

19. The system and process in claim 1, which contain changes in specific design details of any of the equipment, rearrangement of components of the equipment, replacement of the equipment or addition of other equipment.

* * * * *